(12) United States Patent
Wang et al.

(10) Patent No.: US 6,925,501 B2
(45) Date of Patent: Aug. 2, 2005

(54) MULTI-RATE TRANSCODER FOR DIGITAL STREAMS

(75) Inventors: Limin Wang, San Diego, CA (US); Ajay Luthra, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 833 days.

(21) Appl. No.: 09/836,006

(22) Filed: Apr. 17, 2001

(65) Prior Publication Data

US 2002/0152317 A1 Oct. 17, 2002

(51) Int. Cl.$^7$ .............................................. G06F 15/16
(52) U.S. Cl. ................. 709/231; 375/240.1; 375/240.12
(58) Field of Search ....................... 709/231; 375/240.1, 375/240.12

(56) References Cited

U.S. PATENT DOCUMENTS

| | | | |
|---|---|---|---|
| 5,477,397 A | | 12/1995 | Naimpally et al. |
| 5,513,181 A | | 4/1996 | Bresalier et al. |
| 5,617,142 A | | 4/1997 | Hamilton |
| 5,619,733 A | | 4/1997 | Noe et al. |
| 5,767,907 A | | 6/1998 | Pearlstein |
| 5,870,146 A | | 2/1999 | Zhu |
| 5,923,814 A | | 7/1999 | Boyce |
| 5,933,500 A | | 8/1999 | Blatter et al. |
| 6,104,441 A | * | 8/2000 | Wee et al. ............. 375/240.15 |
| 6,181,711 B1 | | 1/2001 | Zhang et al. |
| 6,275,507 B1 | | 8/2001 | Anderson et al. |
| 6,434,197 B1 | * | 8/2002 | Wang et al. ........... 375/240.29 |
| 6,490,320 B1 | * | 12/2002 | Vetro et al. ............. 375/240.08 |
| 6,493,386 B1 | * | 12/2002 | Vetro et al. ............. 375/240.1 |
| 6,542,546 B1 | * | 4/2003 | Vetro et al. ............. 375/240.12 |
| 6,574,279 B1 | * | 6/2003 | Vetro et al. ............. 375/240.08 |
| 6,650,705 B1 | * | 11/2003 | Vetro et al. ............. 375/240.08 |

FOREIGN PATENT DOCUMENTS

EP     0 627 854     12/1994

OTHER PUBLICATIONS

Jay Reimer (IEEE, 1989, 0098 3063/89/0200, A Multi–Rate Transcoder).*
G. Keesman, et al., "Transcoding of MPEG bitstreams," Signal Processing : IMAGE Communication, vol. 8, pp. 481–500, 1996.
Björk, Niklas et al., "Transcoder Architectures for Video Coding," IEEE Transactions on Consumer Electronics, vol. 44, No. 1, Feb. 1998, pp. 88–98.
Staff of Cable Television Laboratories Inc., "Digital TV Solutions," From the Labs: Cable World, Feb. 1, 1999.
Gebeloff,Rob., "The Missing Link," http://www.talks.com/interactive/misslink–x.html.
Boyce, J.M., "Data Selection Strategies for Digital VCR Long Play Mode," *Digest of Technical Papers for the International Conference on Consumer Electronics*, New York, Jun. 21, 1994, pp. 32–33.
ISO/IEC/JTC1/SC29/WGII, MPEG Test Model 5, Section 10—Rate Control and Quantization Control, Apr. 1993, pp. 61–65.

(Continued)

*Primary Examiner*—Anthony Knight
*Assistant Examiner*—Sunray Chang
(74) *Attorney, Agent, or Firm*—Robert P. Marley

(57) ABSTRACT

Methods and apparatus are provided to produce a plurality of different rate output bitstreams from a common input bit stream. Overhead data is extracted from the input bit stream. The input bit stream is partially decoded. Thereafter, the at least partially decoded bit stream is re-encoded at different rates, to produce multiple re-encoded bit streams having different rates. The overhead data is combined with each re-encoded bit stream, thereby providing multiple versions of said encoded bit stream at different rates.

29 Claims, 4 Drawing Sheets

OTHER PUBLICATIONS

Youn, J., et al., XP-002224668—Video Transcoder Architectures for Bit Rate Scaling of H.263 Bit Streams, Proceedings ACM Multimedia 99, Orlando, Florida, pp. 243-250, Oct. 30, 1999.

Youn, J., et al., XP-002224667—"Video Transcoding For Multiple Clients," Visual Communications and Image Processing 2000, Perth, WA, Australia, vol. 4067, pt. 1-3, pp. 76-85, Jun. 20, 2000.

* cited by examiner

MULTI-RATE TRANSCODER FOR DIGITAL STREAMS

BACKGROUND OF THE INVENTION

The present invention relates to the multi-rate transcoding of data signals such as video, audio and/or multimedia, and is particularly applicable to the streaming of data from a server to a client over a network, such as the Internet or a satellite or cable television system.

Although the invention is described herein in connection with a multi-rate transcoder for compressed video applications, it should be appreciated that the inventive concepts are applicable to any type of digital data stream in which there is a need to provide the same data at multiple rates. Accordingly, the invention and the appended claims are not limited to the video applications specifically disclosed herein.

Most network applications can be divided into two main components. These are a client and a server. There are numerous examples of clients and servers. In particular, streaming involves sending movies or other content, such as audio and/or other multimedia formats from a server to a client over a network such as Internet. Streaming is different from simple file transfer, in that the client plays the movie (or other content) as it arrives from the network, rather than waiting for the entire movie to be received before playing. Real-time streams can be sent one-to-one (unicast) or one-to-many (multicast). In unicast, the client contacts the server to request a movie. The server then replies to the client with the information about the requested movie. The actual movie streams are then sent to the client. In multicast, one copy of each stream of a movie is "broadcast" over each branch of a network. Clients receive the streams by "joining" the multicast. Not all routers support multicasting.

A client, such as a cable or satellite television subscriber, normally communicates with one server at a time. For example, the client terminal sends a request to a server (unicast) and receives streams from a server (both unicast and multicast). From the server's perspective at any given time, it is common for the server to be communicating with multiple clients. For example, in unicast, a server may send out streams to different clients simultaneously, and in multicast, multiple clients receive streams broadcast by a server.

With recent advances in video compression, the size of raw video material can be significantly reduced by employing compression technology, such as, MPEG 1, 2, 4 (where MPEG are standards promulgated by the Moving Picture Experts Group) and ITU-T H.261, 3, 3+, or L (where ITU standards are promulgated by the International Telecommunications Union), without sacrificing picture quality. Hence, it is expected that there will be a greater amount of pre-compressed video material available at the server end in the future. A server may therefore need to have the capability to adjust the rates of pre-compressed video material stored at the server end in order to accommodate the bandwidth requirements of different clients. A transcoder is one options for addressing this problem. By definition, a transcoder is a device for converting a pre-compressed bit stream into another bit stream with different formats. Such different formats can include resolution, bit rates, and other variable parameters. The present invention provides a transcoder that provides rate conversion of a single input stream to provide a plurality of different rate output streams.

When client (e.g., a set-top box for receiving television services at a subscriber's home) requests a movie, for example, it often provides information about the network condition at the client end as well. The server can then transcode the pre-compressed streams of the requested movie at a bandwidth suitable for the client end. An issue that has to be addressed, however, is that the server may receive multiple requests for the same movies from different clients. Moreover, the bandwidth at the client ends can be very different. For example, a phone modem at 56 Kb/s and a Cable modem at a few Mb/s have different abilities to receive data from the server. Hence, it would be advantageous for a single compressed video bit stream at the server end be transcoded into several different new streams at different rates. A straightforward solution would be to use different transcoders to transcode the same input video stream at different rates in response to the client requests. This solution is not practical, however, as it requires the server to have as many transcoders as the clients it serves, which would be cost prohibitive.

Another solution would be for one transcoder at the server end to process the same video stream as many times as requested by different clients, but one at a time. That is, before the server completes the request by one client, the rest of the clients will have to wait. Thus, to address the issue of one server and multiple services, either the system operator will have to install more transcoders or the clients will have to wait for their turn to receive the requested service (e.g., movie). Moreover, by the above two solutions, all the function blocks in a transcoder are required to be implemented for each request for the same video bit stream.

It would be advantageous to provide a reliable and cost effective transcoding solution that enables concurrent delivery of a service to a population of users (clients) at different bit rates, depending on the client requirements. The present invention provides a multi-rate transcoding solution having the aforementioned and other advantages.

SUMMARY OF THE INVENTION

In accordance with the invention, transcoder apparatus is provided for an encoded bit stream. A data processor extracts overhead data from the bit stream. A decoder is provided for at least partially decoding the bit stream. A rate control processor re-encodes the at least partially decoded bit stream at different rates, to produce multiple re-encoded bit streams having different rates. A multiplexer combines the overhead data with each re-encoded bit stream, thereby providing multiple versions of the encoded bit stream at different rates.

In a preferred embodiment, a multiplexer provides the multiple versions of the encoded bit streams substantially simultaneously. The encoded bit stream can be a compressed video bit stream, with the transcoder being located at a streaming video server for providing multiple versions of the video bit stream to different clients, at different rates, substantially simultaneously.

In an implementation where the encoded bit stream is a compressed video bit stream, the overhead data can comprise at least one of video object sequence (VOS), video object (VO), video object layer (VOL), video object plane (VOP), group of video object planes (GOV) and motion vector (MV) data. The overhead data can, for example, be extracted from packet headers contained in the encoded bit stream. It should be appreciated that while certain of the terms used herein, such as VO, VOL, VOP, and GOV may be specific to a particular standard, such as MPEG-4, the concepts embodied thereby may be found in other standards. Thus, the use herein and in the claims of a term found in a particular standard is not meant to be limited to that standard, but is intended to be broadly construed as applicable to any standard or technique in accordance with the present invention.

In one embodiment, the rate control processor re-encodes said at least partially decoded bit stream a plurality of times to produce the multiple re-encoded bit streams on a sequential basis. More specifically, the rate control processor can re-encode the at least partially decoded bit stream separately for each of the multiple re-encoded bit streams.

Typically, the encoded bit stream is received at a first rate. The rate control processor can operate at a second rate of at least N times said first rate, where N is the number of re-encoded bit streams provided. In this manner, the re-encoded bit streams are all provided substantially concurrently with the original compressed video bit stream.

In an advantageous embodiment, first functions that do not effect the rates of the re-encoded bit streams are performed only once on the encoded bit stream. Second functions that effect the rates are performed separately for each re-encoded bit stream.

In a embodiment where the encoded bit stream is a compressed video bit stream, the first functions may comprise at least one of variable length decoding and dequantization. The second functions may comprise at least one of requantization, variable length coding, and motion compensation.

The rate control processor can comprise a plurality of encoders operating in parallel to produce the multiple re-encoded bit streams. The re-encoded bitstreams can be provided as variable bitrate streams and/or constant bitrate streams, depending on the client requirements.

In order to efficiently provide a plurality of different rate output streams, processor cycles of the rate control processor can be monitored, and at least one processing step can be skipped in the event the number of processing cycles available to complete a rate control operation would otherwise be insufficient. For example, where the encoded bit stream comprises a compressed video bit stream, at least one of a motion compensation step and a discrete cosine transformation (DCT) step can be skipped for a bi-directionally predicted (B) frame in the event the number of processing cycles available to complete a rate control operation would otherwise be insufficient.

In another optimization technique, the rate control processor can be implemented to re-encode the at least partially decoded bit stream a plurality of times to produce the multiple re-encoded bit streams on a sequential basis, while selectively skipping at least one processing step for fewer than all of the multiple re-encoded bit streams.

Corresponding methods are also provided.

DETAILED DESCRIPTION OF THE INVENTION

According to the present invention, transcoder apparatus is provided for simultaneously providing a plurality of bit streams encoded at different rates from a single input bit stream, such as a compressed video bit stream.

A basic concept of the invention is the provision of a multi-rate transcoder. This transcoder can take a single compressed video bit stream as input and substantially simultaneously generate multiple streams at different rates at the request of different clients.

Figure 1:
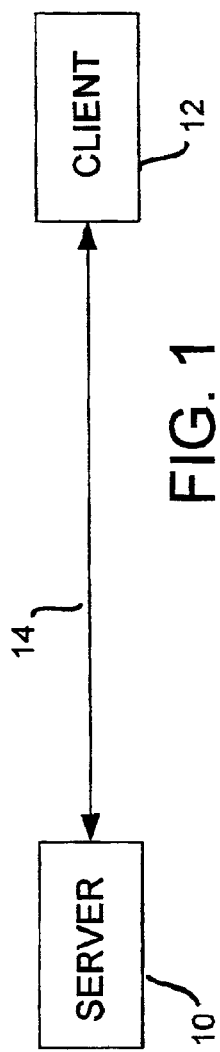
FIG. 1 is a block diagram of a client server network.
Figure 2:
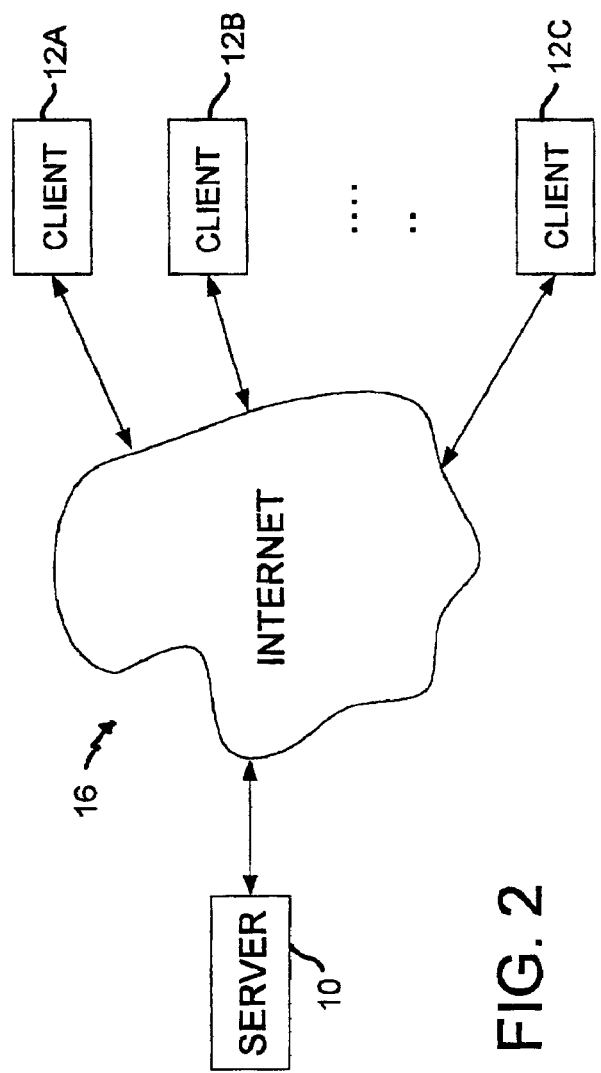
FIG. 2 illustrates the concept of multiple clients being served by the same server over a network such as the Internet.

FIG. 1 illustrates a simple network application, in which a client 12 communicates with a server via communication path 14. Such client-server networks are well known in the art. While a client normally communicates with one server at a time, typically sending a request to the server and receiving an information data stream in response, a server will typically communicate with a plurality of clients simultaneously. This is illustrated in FIG. 2, wherein server 10 communicates with multiple clients 12A, 12B . . . 12C via, e.g., the Internet 16. The clients can be any of a number of different appliances, including, without limitation, personal computers (PCs), wireless Internet appliances, television set-top boxes, point of sale terminals, wagering terminals, consumer appliances, photocopiers, printers, industrial equipment, automotive systems, and the like. Typically, the different clients (even those of the same general type, such as set-top boxes) will have different processing capabilities and requirements for receiving data from the server. Such data is often communicated from the server to the client in the form of packetized data streams that comply with an industry wide standard. An example of one such standard is that promulgated by the Motion Picture Experts Group for the communication of compressed digital video signals, and known as MPEG-2. Other standards exist and new standards are currently under development, and the invention is not limited to any such transmission standard.

In a television embodiment, which is one application for the present invention, a client (e.g., cable or satellite television subscriber) may request a movie. As part of the request, the server may receive information about the network condition at the client end of the communication path, and can then transcode pre-compressed streams which carry the requested movie at the bandwidth of the client end. In the event the server receives multiple requests for the same movie from different clients, each client having a different bandwidth requirement, it will be necessary for the transcoder to provide multiple instances of the move at the different required bandwidths.

Figure 3:
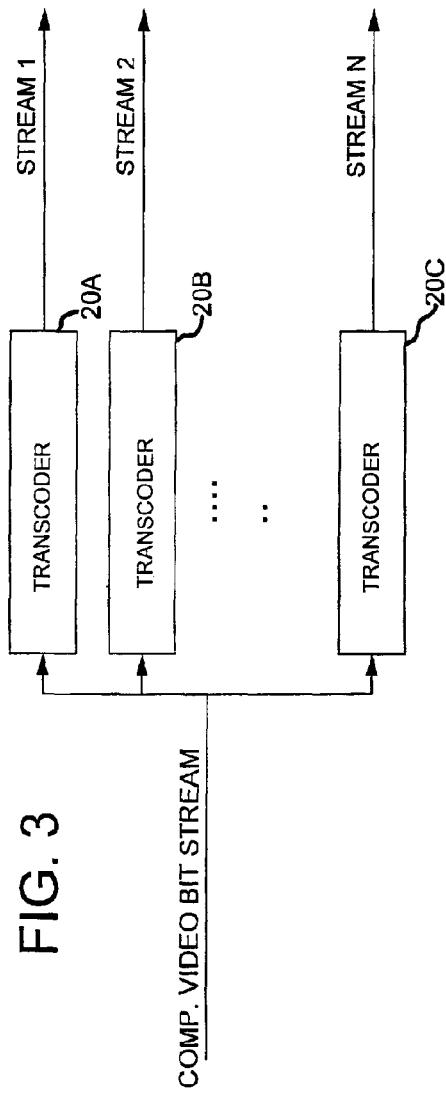
FIG. 3 is a block diagram of a prior art implementation wherein a plurality of transcoders are used to provide a like plurality of output streams from a compressed video bit stream.

A straightforward solution to this problem is to transcode the same input video stream at different rates as required by the different clients, as illustrated in FIG. 3. A disadvantage of this solution is that the server is required to have as many different transcoders as the clients it serves. This is not realistic.

Figure 4:
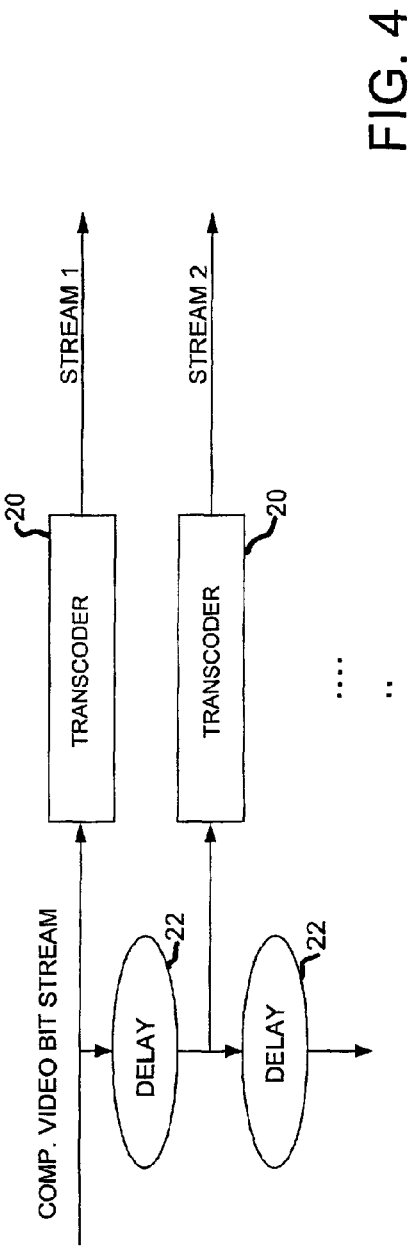
FIG. 4 is a block diagram of a prior art implementation in which one transcoder is used to process the same compressed video bit stream in a sequential manner.

Another solution is for the transcoder at the server to process the same video stream as many times as requested by different clients, but one at a time. In such an embodiment, before the server completes the request by one client, the rest of the clients will have to wait their turn to see the requested movie or other service requested. Such an embodiment is shown in FIG. 4, wherein the transcoder 20 first provides Stream 1 from the compressed video bit stream, then provides Stream 2 after a delay 22, and then provides Stream N after another delay 22 (or series of delays depending on intervening requests), and so forth. Again, this is not a realistic solution as real-time provision of services on request is not provided.

Figure 5:
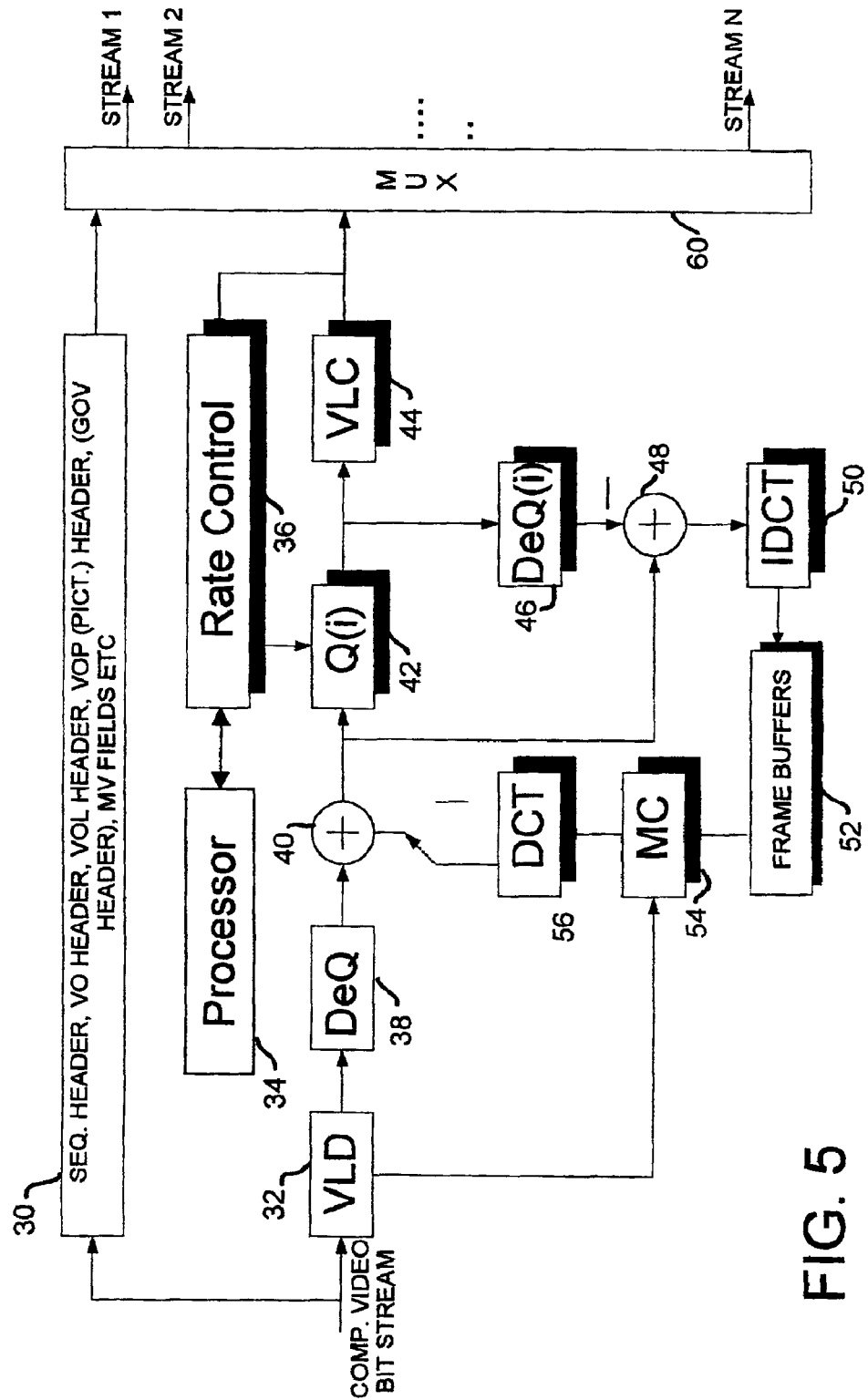
FIG. 5 is a block diagram illustrating the present invention, wherein multiple streams at different rates are produced simultaneously from a compressed video bit stream provided as input.

The present invention overcomes the problems noted above by providing a multi-rate transcoder which processes a single compressed bit stream, such as a video bit stream, and concurrently generates multiple streams therefrom at different rates upon request from a plurality of clients. FIG. 5 shows one possible architecture for a multi-rate transcoder in accordance with the invention. Assume a pre-compressed video bit stream arrives. This stream is applied to a header processor 30 and a variable length decoder 32 (assuming that the bit stream contains variable length packets). At the header processor 30, header segments of the pre-compressed video bit stream, such as, video object sequence (VOS), video object (VO), video object layer (VOL), group of video object planes (GOV) and video object plane (VOP) will be scanned out only once for subsequent multiplexing in a multiplexer 60 with the various different rate streams to be produced.

Next, at the macroblock (MB) level of video processing (MBs are defined, for example, in the widely available MPEG-2 specification), since motion vector (MV) fields are re-used, they can simply be copied into new streams. This is illustrated in block 30, which shows that the MV fields are treated like the header information described above.

For purposes of illustration, assume that N streams need to be generated at N different rates as requested by N clients. At the MB/block level, the shadowed function blocks, including quantizer (Q(i)) 42, dequantizer (DeQ(i)) 46, variable length coder (VLC) 44, Rate Control subsystem 36, Discrete Cosine Transform processor (DCT) 56 and inverse DCT (IDCT) 50, as well as motion compensation engine (MC) 54 will perform N times, one for each requested rate. As shown in FIG. 5, the rate control function is controlled by a processor 40, which can be a microprocessor as well known in the art. An example of a rate control processor that can be implemented for use in connection with the present invention is disclosed in commonly assigned U.S. patent application Ser. No. 09/198,867 filed on Nov. 28, 1998 and entitled "Rate Control for an MPEG Transcoder Without A Priori Knowledge of Picture Type."

The plain function blocks, such as variable length decoder (VLD) 32 and Dequantizer (DeQ) 38, are implemented only once in accordance with the present invention. Specifically, each input MB in compressed bits will go through the VLD 32 and DeQ 38. If the MB is in intraframe mode, it is passed via gate 40 to quantization block (Q(i)) 42 directly. If in interframe mode, the MB in the DCT domain is first motion compensated via gate 40, which receives quantization errors from the previous frame stored in Frame Buffers 52 after being processed by DeQ(i) 46, summer 48, and IDCT 50, and subsequently processed by Motion Compensator (MC) 54 and DCT 56 in a conventional manner. Rate control 36, in accordance with signals from processor 34, will assign the MB a new quantization factor, Q(i), for each new rate requested by client i. The quantized coefficient errors are variable length coded at 44, which generates a new stream at a new rate. In the feedback loop for the motion compensation stage, the coefficient errors dequantized at 46 are subtracted from the coefficient errors at 48 and stored in Frame Buffers 52, one for each different rate stream. Note that the motion compensation uses the same motion vector (MV) field decoded from the VLD, but different reference (quantization error) frames for different new streams.

Figure 6:
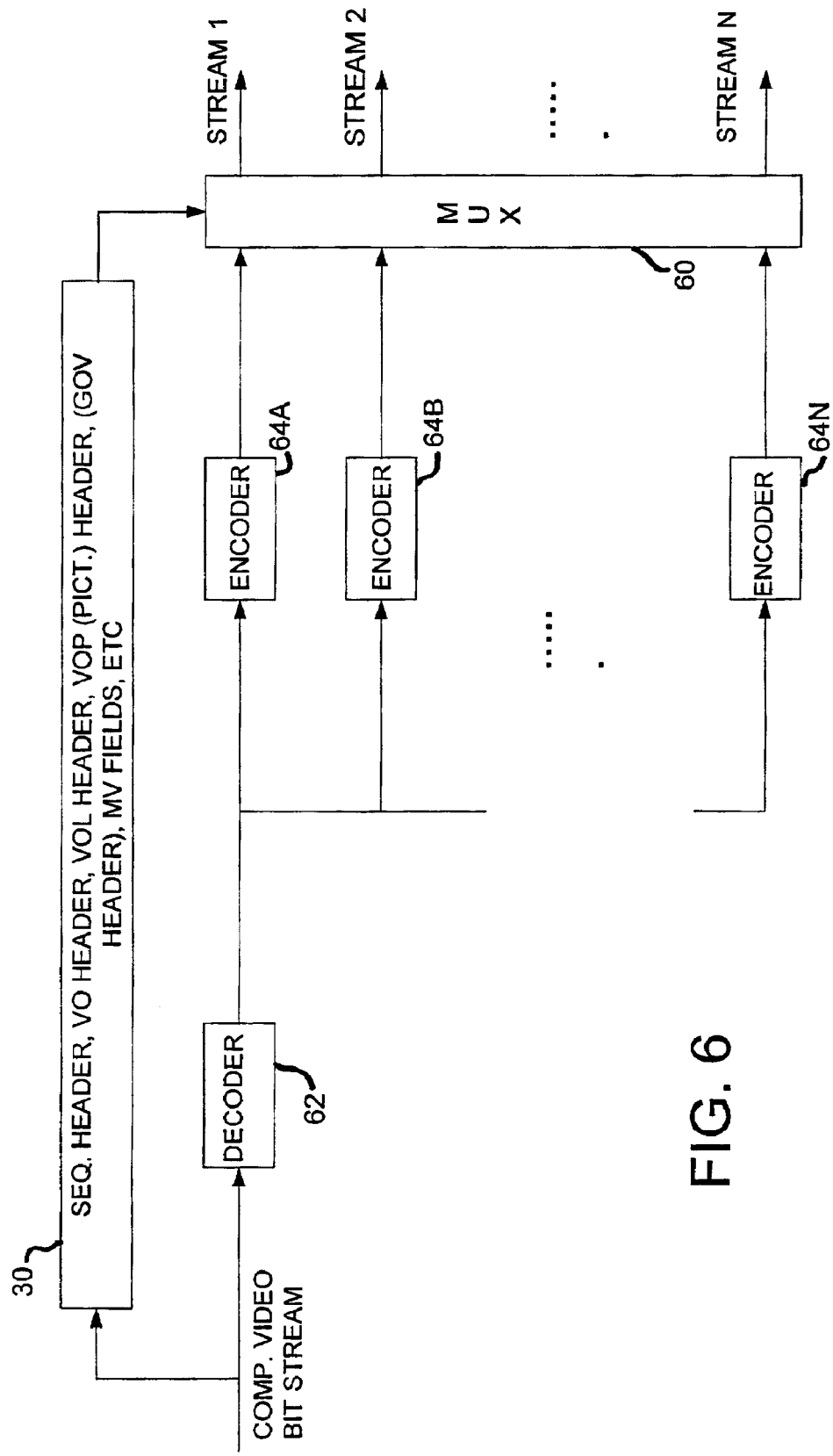
FIG. 6 is a block diagram of an embodiment where a macroblock is decoded only once, and re-encoded by different encoders to provide a plurality of streams at different rates.

Various new features of the proposed multi-rate transcoder are as follows:
1. The multi-rate transcoder can be applied to almost all video coding standards, such as MPEG 1, 2, 4 and H.261, 3, 3+, L.
2. The principle of the proposed multi-rate transcoder is one decode operation and multiple encode operations. This principle can be used for almost all transcoder architectures, such as cascaded transcoders with or without reuse of MV fields, and transcoders with various shortcuts. For example, in FIG. 6, an input MB is decoded only once by a decoder 62, but, it is re-encoded by different encoders 64A, 64B, . . . 64N, resulting in different streams after being multiplexed in multiplexer 60 with the common header data from header processor 30.
3. The output streams can be either constant bit rate (CBR) or variable bit rate (VBR), depending upon the client requests.
4. Within a limited CPU cycle, the multi-rate transcoder may choose to abandon some of the function blocks of FIG. 5. For example, if short of CPU cycles, one or more of the function blocks such as DCT 56, MC 54, Frame Buffers 52, IDCT 50, summer 48 and/or DeQ(i) 46 may not be performed for bi-directionally predicted (B )frames, which can save a significant number of CPU cycles. Since B frames are never used as reference frames, the overall video quality will not be affected too much and no error propagation will be caused. The multi-rate transcoder can also selectively stop performing some of the function blocks for different streams, depending upon the priorities.

Various advantages of the inventive multi-rate transcoder over prior art solutions are as follows:
1. A server is able to offer multiple new streams at different rates simultaneously.
2. Header segments (VOS, VO, VOL, GOV and VOP) are scanned only once and copied into different new streams directly.
3. Decoding function blocks, such as VLD and DeQ, only have to be implemented once for different streams at different rates.
4. The multi-rate transcoder can choose to perform either all or some of the function blocks for different streams.

It should now be appreciated that the present invention provides a multi-rate transcoder that provides multiple output streams at different rates from a single input stream. The output streams are provided concurrently, without the need to duplicate encoder structure that is already available. Common processing of the input stream is provided to the extent possible for all of the different output streams. Processing functions that are not common to all of the N output streams can be implemented at a rate that is essentially N times the rate it takes to process a single stream, so that all of the streams can be provided on a real-time basis. Hardware and software requirements are reduced as compared with prior art multiple transcoder solutions, and processing requirements are reduced as compared to a single transcoder solution.

Although the invention has been described in accordance with particular embodiments thereof, it should be appreciated that various adaptations and modifications may be made thereto without departing from the scope of the invention as set forth in the following claims.

What is claimed is:

1. Transcoder apparatus for an encoded bit stream, comprising:
   a data processor for extracting overhead data from said bit stream;
   a decoder for at least partially decoding said bit stream;
   a rate control processor for re-encoding the at least partially decoded bit stream at different rates, to produce multiple re-encoded versions of said bit stream, each version of said bit stream carrying the same content and having different rates; and
   a multiplexer adapted to combine the overhead data with each of said re-encoded bit streams, and to substantially simultaneously output multiple versions of said encoded bit stream at different rates.

2. Apparatus in accordance with claim 1 wherein:
   said encoded bit stream is a compressed video bit stream; and
   said transcoder is located at a streaming video server for providing said multiple versions to different clients substantially simultaneously.

3. Apparatus in accordance with claim 1 wherein:
   said encoded bit stream is a compressed video bit stream; and
   said overhead data comprises at least one of video object sequence (VOS), video object (VO), video object layer (VOL), video object plane (VOP), group of video object planes (GOV) and motion vector (MV) data.

4. Apparatus in accordance with claim 1 wherein said overhead data is extracted from packet headers contained in said encoded bit stream.

5. Apparatus in accordance with claim 1 wherein said rate control processor re-encodes said at least partially decoded bit stream a plurality of times to produce said multiple re-encoded bit streams on a sequential basis.

6. Apparatus in accordance with claim 5 wherein said rate control processor re-encodes said at least partially decoded bit stream separately for each of the multiple re-encoded bit streams.

7. Apparatus in accordance with claim 1, wherein:
   said encoded bit stream is received at a first rate; and
   said rate control processor operates at a second rate of at least N times said first rate, where N is the number of re-encoded bit streams provided;
   such that the re-encoded bit streams are all provided substantially concurrently with the original compressed video bit stream.

8. Apparatus in accordance with claim 1, wherein:
   first functions that do not effect the rates of the re-encoded bit streams are performed only once on said encoded bit stream; and
   second functions that effect said rates are performed separately for each re-encoded bit stream.

9. Apparatus in accordance with claim 8, wherein:
   said encoded bit stream is a compressed video bit stream;
   said first functions comprise at least one of variable length decoding and dequantization; and
   said second functions comprise at least one of requantization, variable length coding, and motion compensation.

10. Apparatus in accordance with claim 1, wherein said rate control processor comprises a plurality of encoders operating in parallel to produce said multiple re-encoded bit streams.

11. Apparatus in accordance with claim 1, wherein said re-encoded bitstreams are provided as variable bitrate streams.

12. Apparatus in accordance with claim 1, wherein said re-encoded bitstreams are provided as constant bitrate streams.

13. Apparatus in accordance with claim 1, wherein:
   processor cycles of said rate control processor are monitored; and
   at least one processing step is skipped in the event the number of processing cycles available to complete a rate control operation may otherwise be insufficient.

14. Apparatus in accordance with claim 13, wherein:
   said encoded bit stream is a compressed video bit stream; and
   at least one of a motion compensation step and a DCT step are skipped for a bi-directionally predicted (B) frame in the event the number of processing cycles available to complete a rate control operation may otherwise be insufficient.

15. Apparatus in accordance with claim 13, wherein the rate control processor:
   re-encodes said at least partially decoded bit stream a plurality of times to produce said multiple re-encoded bit streams on a sequential basis; and
   selectively skips said at least one processing step for fewer than all of said multiple re-encoded bit streams.

16. A method for providing a plurality of different rate output bitstreams from a common input bit stream, comprising:
   extracting overhead data from said input bit stream;
   at least partially decoding said input bit stream;
   re-encoding the at least partially decoded bit stream at different rates to produce multiple re-encoded versions of said bit stream, each version of said bit stream carrying the same content and having different rates; and
   combining the overhead data with each of said re-encoded bit streams; and
   outputting substantially simultaneously multiple versions of said encoded bit stream at different rates.

17. A method in accordance with claim 16, wherein said multiple versions are simultaneously provided from a server to a plurality of different clients.

18. A method in accordance with claim 16, wherein:
   said input bit stream comprises a compressed video bit stream; and
   said overhead data comprises at least one of video object sequence (VOS), video object (VO), video object layer (VOL), video object plane (VOP), group of video object planes (GOV) and motion vector (MV) data.

19. A method in accordance with claim 16, wherein said overhead data is extracted from packet headers contained in said encoded bit stream.

20. A method in accordance with claim 16, wherein said re-encoding step re-encodes said at least partially decoded bit stream a plurality of times to produce said multiple re-encoded bit streams on a sequential basis.

21. A method in accordance with claim 20, wherein said re-encoding step re-encodes said at least partially decoded bit stream separately for each of the multiple re-encoded bit streams.

22. The method in accordance with claim 16, wherein:
   said encoded bit stream is received at a first rate; and
   said re-encoding step is performed at a second rate of at least N times said first rate, where N is the number of re-encoded bit streams provided;

such that the re-encoded bit streams are all provided substantially concurrently with the original compressed video bit stream.

23. A method in accordance with claim 16, wherein;

first functions that do not effect the rates of the re-encoded bit streams are performed only once on said encoded bit stream; and second functions that effect said rates are performed separately for each re-encoded bit stream.

24. A method in accordance with claim 23, wherein:

said input bit stream comprises a compressed video bit stream;

said first functions comprise at least one of variable length decoding and dequantization; and said second functions comprise at least one of requantization, variable length coding, and motion compensation.

25. A method in accordance with claim 16, wherein said re-encoded bitstreams are provided as variable bitrate streams.

26. A method in accordance with claim 16, wherein said re-encoded bitstreams are provided as constant bitrate streams.

27. A method in accordance with claim 16, wherein:

processing cycles of said re-encoding step are monitored; and at least one re-encoding step is skipped in the event the number of processing cycles available to complete a re-encoding operation may otherwise be insufficient.

28. A method in accordance with claim 27, wherein:

said input bit stream is a compressed video bit stream; and at least one of a motion compensation step and a DCT step are skipped for a bi-directionally predicted (B) frame in the event the number of processing cycles available to complete a re-encoding operation may otherwise be insufficient.

29. A method in accordance with claim 27, wherein the re-encoding step:

re-encodes said at least partially decoded bit stream a plurality of times to produce said multiple re-encoded bit streams on a sequential basis; and selectively skips said at least one processing step for fewer than all of said multiple re-encoded bit streams.

* * * * *